United States Patent [19]

Sack

[11] 4,057,911

[45] Nov. 15, 1977

[54] PORTABLE PSYCHO-PHYSICAL AUTOMOBILE DRIVER TESTING DEVICE

[76] Inventor: Thomas F. Sack, 354 N. Bromley Ave., Scranton, Pa. 18504

[21] Appl. No.: 709,717

[22] Filed: July 29, 1976

[51] Int. Cl.² .............................................. G09B 9/04
[52] U.S. Cl. ................................................. 35/11 R
[58] Field of Search ................... 35/11, 22 R; 351/17, 351/36, 38

[56] References Cited

U.S. PATENT DOCUMENTS

| | | | |
|---|---|---|---|
| 2,224,564 | 12/1940 | De Silva | 35/22 R |
| 2,751,812 | 6/1956 | Sheppard et al. | 35/11 R X |

*Primary Examiner*—William H. Grieb
*Attorney, Agent, or Firm*—Edmund M. Jaskiewicz

[57] ABSTRACT

A portable automobile driver testing unit comprises a cabinet having two side walls which can be swung open and an end wall in which there is a sight opening. In the bottom portion of the cabinet there is a compartment enclosed by a control panel and on the inner face of the cabinet top wall there are mounted relatively moveable elements for testing depth perception. The end wall with the opening is further provided with a pair of headlights, a first group of lights having removable letters and the brightness of which can be controlled by a rheostat, and a plurality of colored lights. A foot pedal assembly is connected to the control panel to be used in conjunction with the colored lights for testing reaction time and the assembly is stored upon the partition within the cabinet when not in use. A person facing the end wall with the opening and lights can be tested for depth perception, night vision, glare recovery, field of vision and simple and complex reaction time. The unit can also be used to test for visual acuity and traffic color recognition.

6 Claims, 9 Drawing Figures

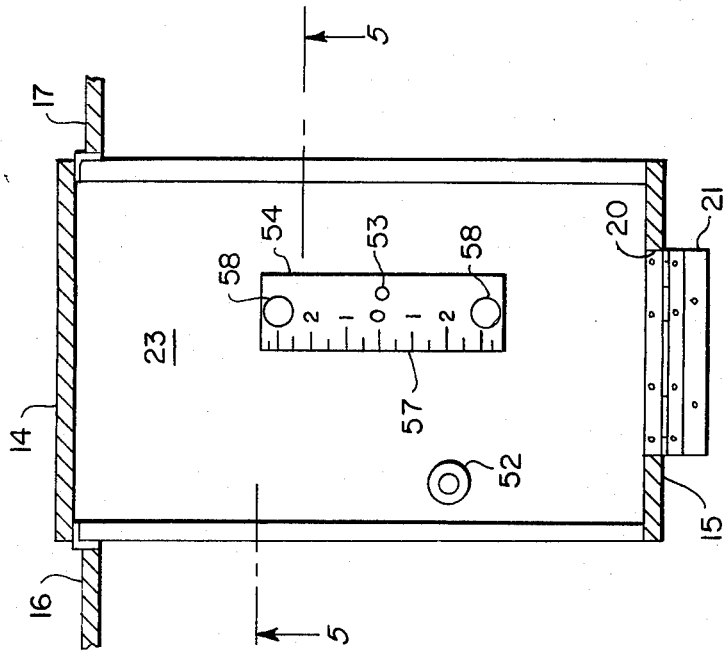
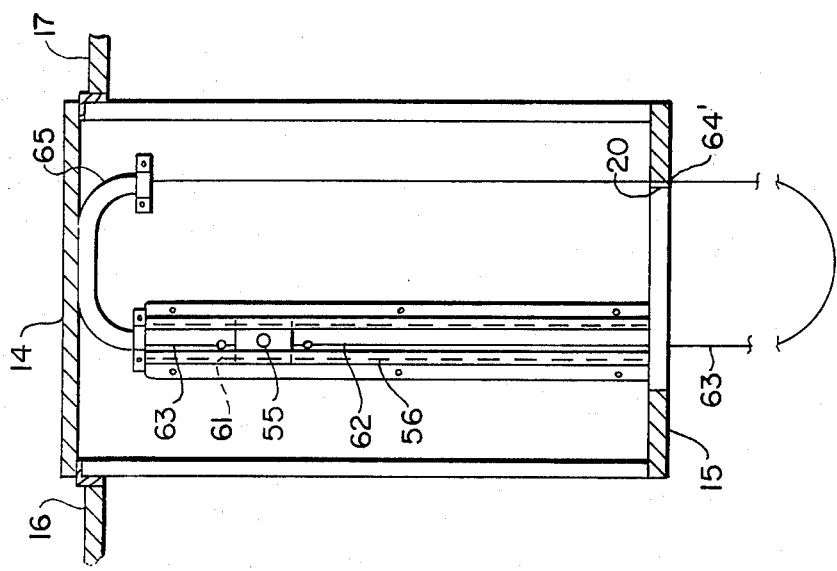

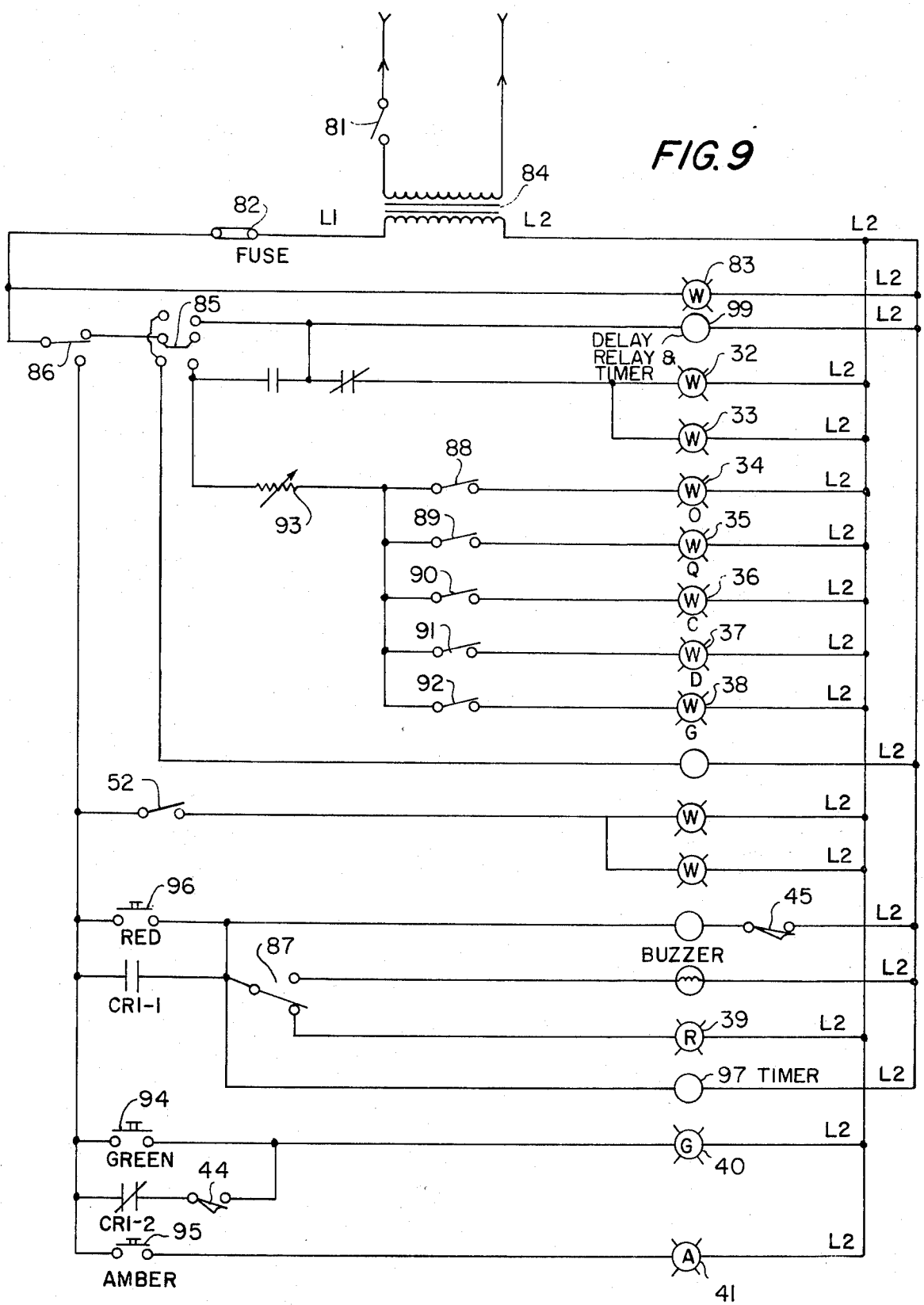

PORTABLE PSYCHO-PHYSICAL AUTOMOBILE DRIVER TESTING DEVICE

The present invention relates to automobile driver testing equipment, more particularly, to a portable unit with which a number of different psycho-physical tests can be conducted on a person.

In order to determine whether persons are qualified for certain occupations and activities it has long been considered desirable to test those persons for their response to visual and audio stimuli. Since many activities such as the flying of aircraft or the driving of motor vehicles require unimpaired vision many tests have been devised to test various factors such as depth of vision, visual acuity, night vision and the timing of reactions to visual stimuli and others. Many different kinds of devices have been devised to test and measure according to predetermined standards such properties of vision. Since the driving of motor vehicles both privately and commercially is a universally accepted activity many devices have been devised for the psycho-physical testing of persons seeking to drive motor vehicles. The driving of motor vehicles is very closely regulated by countries, states and other political units so that in many cases it is mandatory that persons seeking to drive must first pass various tests. Since a successful driver of a motor vehicle must have a high degree of reflex action many of these tests and testing devices are concerned with ascertaining the reaction of persons to various stimuli.

Since it is now mandatory in many countries of the world for beginning drivers to take various psycho-physical tests and to take formal training in the driving of vehicles considerable effort has been made to provide various forms of apparatus which are simple in operation and structure but which accurately measure various factors considered essential for proper driving habits. While the foregoing has been the goal, it has been difficult to achieve with most forms of testing apparatus. Portable devices have been proposed for testing certain factors. However, such devices have been limited in the number of factors which could be accurately tested and it was therefore necessary to have a number of different testing units in order to carry out a proper sequence of tests. In addition, many of the testing units were rather complicated in structure and operation and thus required highly trained personnel for their successful operation.

The various forms of portable testing units which are presently known are generally limited in the number of tests which they can carry out and in most cases such testing units comprise a number of portable testing components which must be transported separately and then interconnected in order to carry out the testing.

It is therefore the principal object of the present invention to provide a novel and improved portable psycho-physical automobile driver testing device.

It is another object of the present invention to provide such a driver testing device which is complete in that it enables the entire series of tests deemed essential for driver testing to be quickly and accurately carried out.

It is a further object of the present invention to provide a portable psycho-physical testing device which quickly and accurately tests a number of psycho-physical factors of a person.

It is an additional object of the present invention to provide such a testing device which is simple in construction and operation, requires a minimum of maintenance and can be successfully and accurately operated under testing conditions by individuals who do not have to undergo long and difficult training periods.

According to one aspect of the present invention there is disclosed a portable psycho-physical automobile driver testing device which may comprise a cabinet having top and bottom walls interconnected by end walls and a pair of side walls which are pivotally mounted to swing outwardly from the cabinet. One of the end walls has a sight opening therein and is directed toward a person being tested. Within the cabinet there is a partition intermediate the top and bottom walls and extending between the end walls to form a compartment between the partition and bottom wall and a control panel is mounted within the cabinet to enclose the compartment. Mounted on the inner face of the top wall within the cabinet are means for testing the depth perception of a person who views the means through the opening in the end wall. The end wall is provided with a pair of headlights and a group of lights with printed indicia which are interconnected through suitable means to the control panel for testing glare recovery reaction time and night vision.

The end wall is provided with a second group of colored lights which are interconnected with the control panel for testing reaction time.

A foot pedal assembly is also connected with the group of colored lights for use in testing simple and complex reaction times. The foot pedal assembly is dimensioned so as to be positionable upon the partition within the periphery thereof when not in use. By positioning the foot pedal assembly within the cabinet the cabinet can be closed when being transported and thus the closed cabinet would constitute a complete portable unit for testing purposes.

The testing unit according to the present invention is advantageous in that it eliminates previous limitations on psychophysical testing programs of driver education and training. Such programs have previously been limited of the lack of qualified testing personnel, the high price of testing equipment which demanded a large amount of space, and the excessive time and manpower required to capably operate and maintain the testing devices.

The testing unit when in its transport position is not much larger than an overnight suitcase. The completeness and portability of the unit make it available for use anywhere including the classroom, training room, testing laboratory, garage or in the field.

Other objects and advantages of the present invention will be apparent upon reference to the accompanying description when taken in conjunction with the following drawings, which are exemplary, wherein, FIG. 1 is an overall perspective view of the testing device according to the present invention showing the cabinet side walls as being open and the different parts being positioned for carrying out certain tests;

FIG. 3 is a sectional view taken along the line 3—3 of FIG. 2 so as to look upwardly at the inner surface of cabinet top wall;

FIG. 4 is a sectional view taken along the line 4—4 of FIG. 2;

FIG. 9 is a wiring diagram showing schematically the electrical connections between the several components of the testing device.

Proceeding next to the drawings wherein like reference symbols indicate the same parts throughout the various views a specific embodiment and modifications of the present invention will be described in detail.

Figure 1:
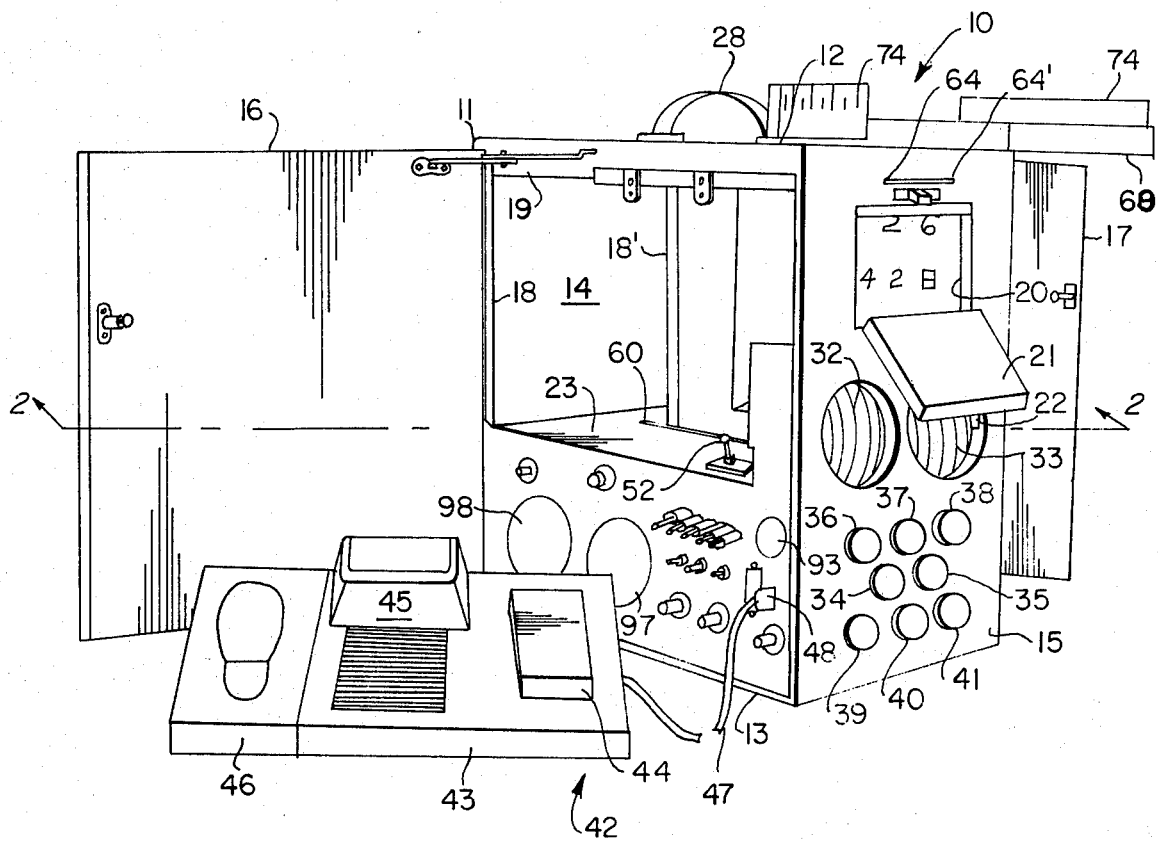
Figure 2:
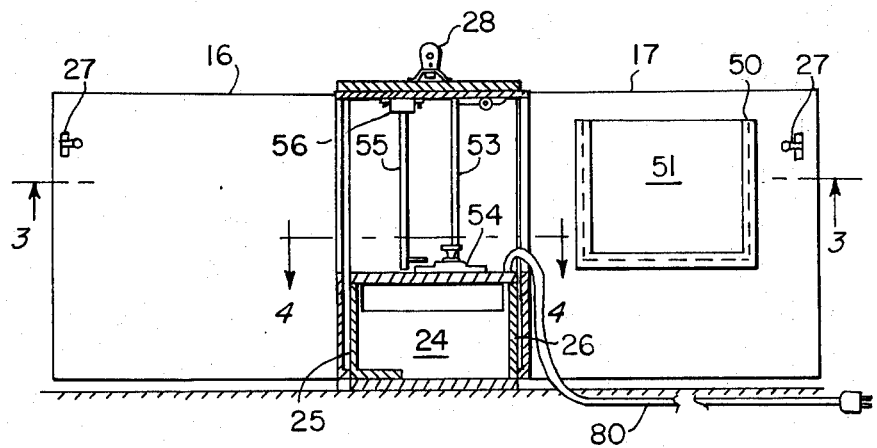
FIG. 2 is a sectional view taken along the line 2—2 of FIG. 1.
Figure 5:
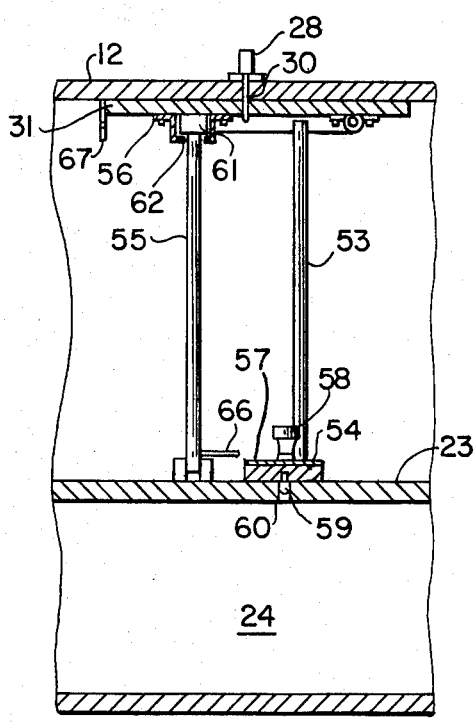
FIG. 5 is a sectional view taken along the line 5—5 of FIG. 4.

The testing device of the present invention is indicated generally at 10 in FIG. 1 and comprises a cabinet 11 having a top wall 12 and a bottom wall 13 interconnected by end walls 14 and 15. A pair of side walls 16 and 17 are pivotally connected by hinges 18 and 18' to the end wall 14 so as to swing outwardly from the cabinet into the position as shown in FIGS. 1-3. Hinged brackets 19 are provided to interconnect each of the side walls 16 and 17 with top wall 12 so as to limit the outward pivoting movement of the side walls and into the position where the side walls are at substantially right angles to the cabinet.

Figure 6:
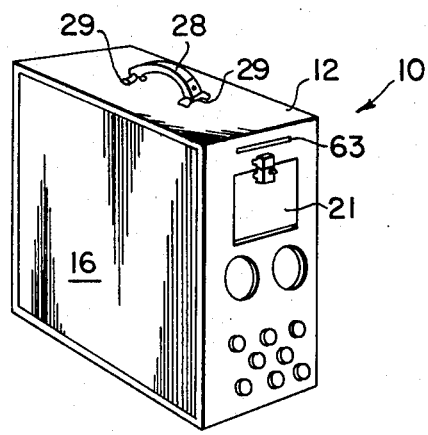
FIG. 6 is an overall perspective view of the cabinet in the closed position in which the device is ready for transportation.

End wall 15 is provided with a sight opening 20 therein which can be closed by a small door 21 hinged to the edge of the sight opening. The door is held closed by a spring bolt 22 or any other suitable locking means. A partition or shelf 23 is mounted within the cabinet intermediate the top and bottom walls and extending between the end walls and side walls as may be seen in FIG. 2 to form a compartment 24. The compartment 24 is enclosed by control panel 25 and a removable wall 26. The side walls 16 and 17 are constructed and assembled so that when closed in the position as shown in FIG. 6 they fit snugly with respect to the bottom, top and end walls. The inner faces of the side walls may be provided with spring catches 27 to hold the doors tightly closed. A carrying handle 28 is provided on the top wall 12 and extends between two rigid brackets or loops 29 which are secured in position by bolts 30 passing through the upper wall 12 and securing a base plate 31 in position on the inner face of the top wall.

The end wall 15 is provided with a pair of automobile sealed beam headlights 32 and 33 and a group of lights 34-38 having printed indicia such as letters therein. The letters may be in the lenses of the lamps and are interchangeable with each other to provide different test variations. Also in the end wall 15 are three colored lenses 39, 40 and 41 which are red, green and amber which are also interchangeable with each other so as to vary the sequence of colors of these lights.

For use with the testing device is a foot pedal assembly 42 which comprises a base platform 43 on which is mounted an accelerator pedal 44 and a brake pedal 45. Pivotally connected to the base 43 is a second base 46 upon which the person being tested places his left foot. The foot pedal assembly 42 is interconnected to the testing device by an electric cable 47 having a four-prong plug 48 thereon which connects into a suitable socket 49 on the control panel 25.

For testing visual acuity, the side wall 17 is provided with a frame 50 for retaining one or more eye charts 51 as known in the art. A light is provided in the cabinet for illuminating the eye chart 51 upon actuation of toggle switch 52 located on the shelf 23 within the cabinet.

For testing depth perception there is provided a stationary rod 53 mounted on a base 54 placed on the shelf 23 and moveable relatively to the fixed rod 53 is a moveable rod 55 mounted within a track 56 attached to the platform 31 on the inner face of the top wall of the cabinet. The base 54 is provided with a scale of graduations 57 which will accurately indicate the position of the moveable rod 55 from the fixed rod 53 after the person completes a test. The base 54 may be movable with respect to the shelf 23 so as to prevent the person being tested, or subject, from predetermining the position of the fixed pin. The base 54 is provided with a pair of knobs 58 on the ends thereof to facilitate handling and on the underside of the base are pins 59 which extend into slots 60 formed in the shelf 23 so as to permit positioning of the base 54 and thereby adjusting of the fixed position of the rod 53. Suitable adjusting devices are provided to fix the base 54 upon the shelf 23. During transportation or storage of the testing device the base 54 is detached from the shelf 23 to provide a space on the shelf for the foot pedal assembly.

The movable rod 55 is mounted in a block 61 which is slidable within the channel-shaped track 56. The upper surface of the track 56 is provided with an elongated slot 62 through which the rod 55 extends. A length of cord or string 63 has its ends attached to opposite sides of the block 61 and the cord in one direction passes outwardly through an opening 64 in the upper portion of end wall 15 to form a loop and then pass inwardly through opening 64' and through a J-shaped tubular element 65 back to be connected to the other side of the block 61. Thus, pulling of the endless cord 63 in either direction will bring about a movement of the displaceable rod 55 in the corresponding direction. The lower end or tip of the rod 55 is provided with a radially extending indicator pin 66 which moves parallel to the scale 57 to indicate the position of the movable rod 55 with respect to the fixed rod 53 and to provide an indication of the magnitude of deviation from the fixed rod.

The length of the cord 63 is such that the person being tested is positioned about 20 feet from the fixed rod. As known, the purpose of the test is for the person to manipulate the cord until the movable rod 55 is adjusted to a position which appears to the person to be at the same relative distance as the fixed rod 53. Any error by the person in determining this distance is then read upon the scale 57 which may have any desired system of indicia or measurement.

Figure 7:
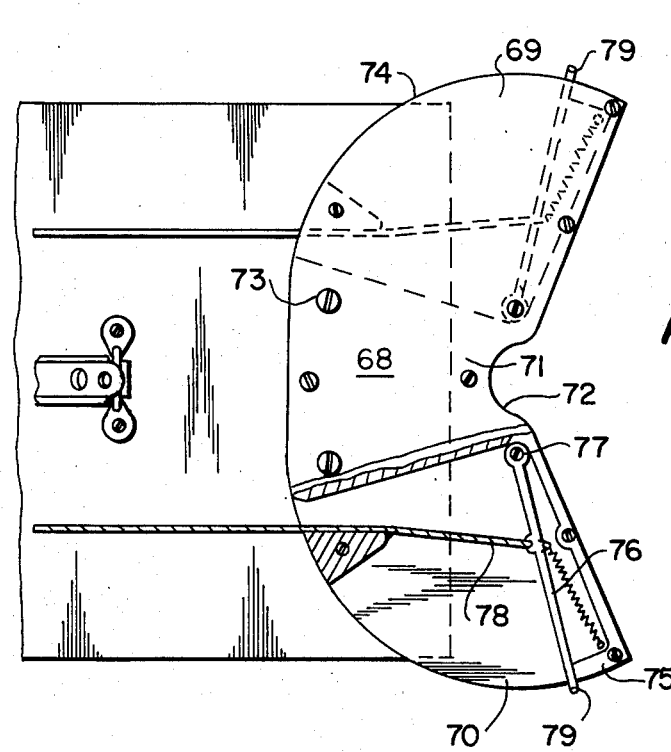
FIG. 7 is a top plan view of a portion of the testing device of FIG. 1 showing the component employed for the range of vision test.

Along the edge of the base platform 31 are two brackets 67 having openings therein upon which a plate-like member 68 which is used in the range-of-vision test is mounted by bolts when the testing device is transported. As may be seen in greater detail in FIG. 7, the plate 68 has arcuate end portions 69 and 70 and an intermediate section 71 having a notch 72 therein. The plate 68 is secured on the outer face of the cabinet top wall 12 by means of bolts 73 passing through suitable openings in the cabinet top wall and secured by wing nuts or the like. Curved plates 74 each of which are graduated in degrees are secured along the edges of the arcuate portions 69 and 70.

Arcuate extensions 75 on the undersides of the arcuate sections 69 and 70 function as stops for arms 76 which are pivotally mounted at 77. Each arm 76 has a cord 78 attached thereto and the outer end of each arm is upturned at 79 so as to define a pointer which moves along the angular scale 74.

A fixed spot may be provided on the handle 28 to be in the line of sight of the person being tested who takes a position with his nose against the notch 72 and looks directly at this spot. The examiner or supervisor conducting the test then pulls on the cords 78 simultaneously or one at a time so as to move the arms 76. The person being tested who concentrates his vision on the fixed spot tells the examiner when he sees the ends 79 and the examiner is then able to determine the field of lateral or peripheral vision on the part of the person being tested by noting the angle on the scale 74 at which the person can first see the upturned end 79.

The testing device is connected to a suitable source of power which may be alternating current generally found in dwellings or commercial establishments through an electric cable 80 extending from the back panel 26 of the compartment 24. In order to energize the testing device, a power switch 81 is provided which is located on the control panel 25 as may be seen in FIG. 8. Also provided on the control panel 25 is a fuse 82 and a light 83 to provide illumination of the control panel in a dark room and also indicates whether the testing device is energized. The electrical connections of the switch 81, fuse 82 and indicator light 83 and other components to be subsequently described are shown in greater detail in FIG. 9. A transformer 84 is provided and the output from this transformer is designated as lines $L_1$ and $L_2$.

A two-position switch 86 may be set to a GLARE position for the glare recovery test and night vision test and to a CLINIC position for the simple and complex reaction time tests. A further two-position switch 87 is used in the reaction time test to provide for energization of either the red light or a buzzer.

Figure 8:
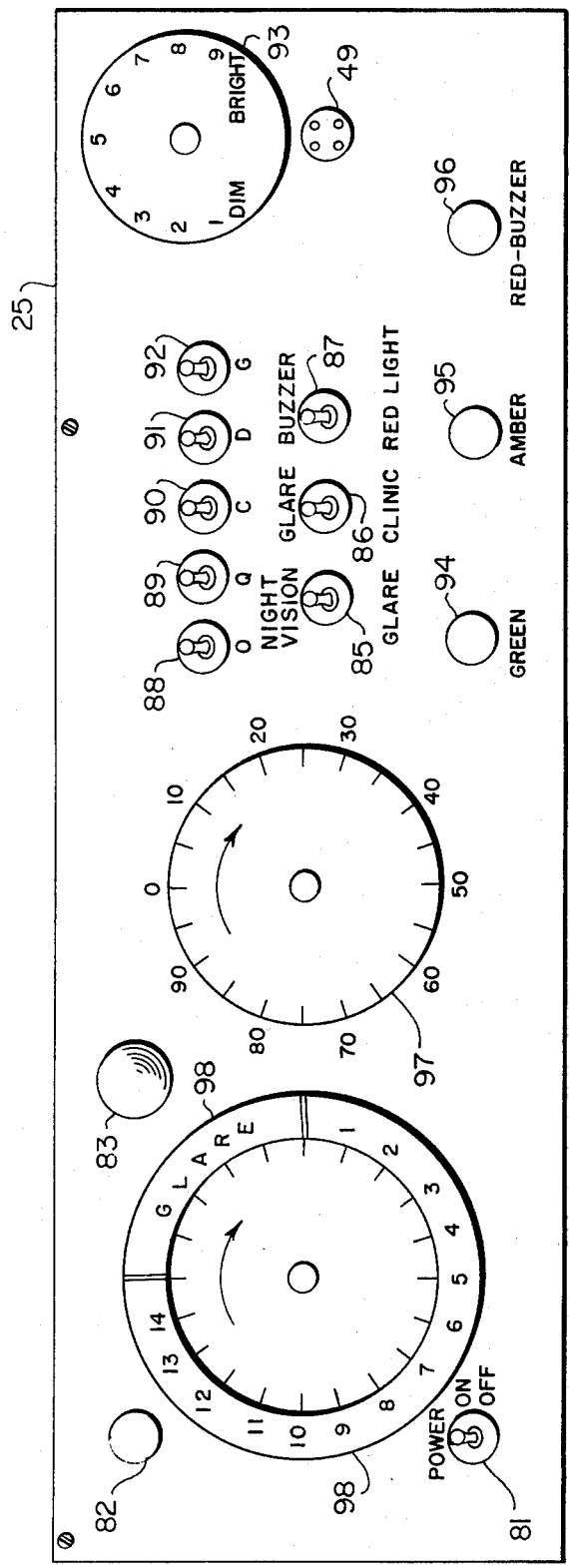
FIG. 8 is an elevational view of the control panel on the testing device.

Switches 88-92 actuate the lighted letters 34-38 on the end wall of the cabinet. These are on-off switches and the brightness of a lighted letter is regulated by a rheostat 93. Along the bottom edge of the control panel are push button switches 94, 95 and 96 for energizing the colored lights 39, 40 and 41 on the cabinet. While these switches have been designated for particular colors as can be seen in FIG. 8 it is pointed out that these lenses along with lenses 34 through 38 are interchangeable so as to prevent persons being tested from predetermining color and letter locations.

In order to administer a traffic color recognition test the examiner depresses the color-coded buttons 94-96 and requests the subject to identify the colored traffic lights.

For the reaction time test, the person being tested is seated directly in front of cabinet end wall 15 so that the person faces the colored lights 39-41 and places his right foot firmly on the accelerator 44 and his left foot on the plate 46 which is correspondingly marked. The examiner resets a timer 97 which is marked in hundredths of a second and then presses the red switch button 96 which turns off the green light, turns the red light on and starts the electric timer. The timer 97 then measures the time which elapses between the red light and when the person moves his right foot from the accelerator to the brake pedal 45. After the brake has been applied, the person being tested then removes his foot from the brake pedal and brings it back to the accelerator.

To measure a more complex reaction time the examiner may actuate the amber button 95 at which signal the subject is to lift his foot from the accelerator but not to apply the brake. The examiner then sets switch 87 for either the buzzer or red light and actuates button 96 at which time the subject is to make the stop as previously described. The subject thus acts in response to either a visual or light-stimulus, or an audio or buzzer-stimulus. Again, the examiner notes the time lapse on the hundredths timer 97.

For the glare recovery test, the examiner sets timer 98 at the vertical line preceeding the word GLARE appearing on the timer. One of the letter switches 88-92 is turned on and switch 85 turned to GLARE at which time the headlights 32 and 33 will automatically go on for a predetermined time and will then automatically turn off and a letter in one of the lights 34-38 will appear. When the subject calls out the correct letter the glare switch is turned to the OFF position and the results are read in seconds from timer 98. The time measured on the timer 98 can be translated into the number of feet a car would travel depending on the speed the car is then traveling when the test is conducted. This distance may well make a meaningful impression on the person being tested.

For the night vision test the person being tested is seated at about 20 feet from the testing device at an eye level with the headlights 32 and 33. The timer 98 is set to zero which is the horizontal line following GLARE on scale 98 and the rheostat 93 is turned to DIM. One of the letter switches 88-92 is then moved to ON and switch 85 is turned to the NIGHT VISION position. The subject then looks at the lights 34-38 and the rheostat is gradually turned toward BRIGHT. The subject then identifies the letter when he first recognizes it and a notation is made of the number on the dial on the rheostat when this recognition is accomplished. This setting of the rheostat can then be calibrated against test results carried out on a large number of people in order to establish norms or standards.

When it is desired to convert the testing unit in condition for transportation the fixed rod base 54 is detached from the shelf and positioned within the cabinet. The cord 63 for manipulating the depth perception unit is drawn within the cabinet and wound around suitable pegs or hooks mounted on a wall of the cabinet. The foot pedal assembly 42 is disconnected from the control panel and placed upon the shelf 23. The field of vision plate 68 is detached from the top wall of the cabinet and by means of the same bolt 73 and wing nuts is attached to the brackets 67 within the cabinet 11. The side walls 16 and 17 are closed and latched in position and the door 21 similarly closed and latched. The testing apparatus is now ready for transportation.

In order to prepare the testing unit for use, the unit is positioned upon a table approximately 30 inches high and sufficiently narrow to permit the examiner access to the rear of the cabinet. The front door 21 is opened by releasing the catch 22 and a hand is then inserted through the view opening 20 to release the spring latches 27 to enable the side walls to be opened. The various components for carrying out the tests as described above are then set up.

Thus it can be seen that the present invention has disclosed a complete portable psycho-physical driver testing unit by means of which a number of tests can be quickly and accurately administered.

It will be understood that this invention is susceptible to modification in order to adapt it to different usages and conditions, and accordingly, it is desired to comprehend such modifications within this invention as may fall within the scope of appended claims.

What is claimed is:

1. A portable psycho-physical automobile driver testing device comprising a cabinet having top and bottom walls interconnected by end walls and a pair of side walls pivotally mounted to swing outwardly from the cabinet, one of said end walls having a sight opening therein and directed toward a person being tested, a partition within said cabinet intermediate said top and bottom walls and extending between said end walls to define a compartment between said bottom wall and the partition, a control panel within said cabinet enclosing the area defined by said end walls, said partition and said bottom wall to enclose said compartment, means within said cabinet mounted on the inner face of said top wall for testing depth perception of a person located at a predetermined distance from said one end wall and viewing said means through said sight opening, a first plurality of colored lights on said one end wall, a pair of headlights on said one end wall, means interconnecting said first plurality of colored lights and said headlights to said control panel for testing respectively reaction time and glare recovery, a second plurality of lights on said one end wall having printed indicia thereon, means interconnecting said second plurality of lights and said control panel for testing night vision, and means including switches on said control panel operable by an examiner positioned in front of said control panel to operate the testing device for actuating said interconnecting means to said first plurality of colored lights, said headlights and said second plurality of colored lights.

2. A device as claimed in claim 1 wherein said printed indicia are removable and replaceable.

3. A device as claimed in claim 1 and rheostat means on said control panel for controlling the brightness of said second plurality of lights.

4. A device as claimed in claim 1 wherein said reaction time testing means further comprises a foot-pedal assembly being so dimensioned so as to be positionable upon said partition within the periphery thereof when not in use.

5. A device as claimed in claim 4 wherein said foot pedal assembly further comprises a brake pedal pad.

6. A device as claimed in claim 4 and means on said control panel for connection to said foot pedal assembly.

* * * * *